United States Patent
Miura et al.

(10) Patent No.: US 8,912,694 B2
(45) Date of Patent: Dec. 16, 2014

(54) ROTATING ELECTRICAL MACHINE

(75) Inventors: Kazuo Miura, Kitakyushu (JP); Yuuto Fukuma, Kitakyushu (JP); Mitsunori Nagao, Kitakyushu (JP)

(73) Assignee: Kabushiki Kaisha Yaskawa Denki, Kitakyushu-Shi (JP)

(*) Notice: Subject to any disclaimer, the term of this patent is extended or adjusted under 35 U.S.C. 154(b) by 47 days.

(21) Appl. No.: 13/305,635

(22) Filed: Nov. 28, 2011

(65) Prior Publication Data

US 2012/0194013 A1 Aug. 2, 2012

(30) Foreign Application Priority Data

Jan. 27, 2011 (JP) ................................ 2011-015338

(51) Int. Cl.
*H02K 9/19* (2006.01)
*H02K 5/20* (2006.01)

(52) U.S. Cl.
CPC ...................................... *H02K 5/20* (2013.01)
USPC .................................. 310/54; 310/58; 310/89

(58) Field of Classification Search
CPC ............. H02K 9/08; H02K 9/22; H02K 9/19
USPC .................................... 310/52, 54, 57–58, 59
See application file for complete search history.

(56) References Cited

U.S. PATENT DOCUMENTS

| | | | | |
|---|---|---|---|---|
| 2,862,120 A | * | 11/1958 | Onsrud | 310/54 |
| 4,739,204 A | * | 4/1988 | Kitamura et al. | 310/68 D |
| 6,239,518 B1 | * | 5/2001 | Matsubara et al. | 310/58 |
| 6,900,561 B2 | * | 5/2005 | Vlemmings et al. | 310/59 |
| 7,122,923 B2 | * | 10/2006 | Lafontaine et al. | 310/58 |
| 2003/0222519 A1 | * | 12/2003 | Bostwick | 310/58 |
| 2009/0315415 A1 | * | 12/2009 | Elnar | 310/54 |
| 2010/0007227 A1 | * | 1/2010 | Smith et al. | 310/64 |
| 2011/0181136 A1 | * | 7/2011 | Nakamori et al. | 310/54 |

FOREIGN PATENT DOCUMENTS

| | | | | |
|---|---|---|---|---|
| CN | 101645630 | | | 2/2010 |
| JP | 07-111758 | | | 4/1995 |
| JP | 2006060914 | A | * | 3/2006 |
| JP | 2010-041835 | | | 2/2010 |

OTHER PUBLICATIONS

JP 2006-060914 English Translation attached.*
Japanese Office Action for corresponding JP Application No. 2011-015338, Apr. 23, 2013.
Chinese Office Action for corresponding CN Application No. 201110444987.2, Sep. 26, 2014.

* cited by examiner

*Primary Examiner* — Tran Nguyen
*Assistant Examiner* — Thomas Truong
(74) *Attorney, Agent, or Firm* — Mori & Ward, LLP

(57) ABSTRACT

A rotating electrical machine according to an embodiment includes a rotor rotatable around a rotation axis, a stator arranged to face the rotor, and a frame which accommodates the rotor and the stator and in which a refrigerant flow path is formed in a sidewall. The frame includes a through hole that penetrates from the refrigerant flow path to an outer periphery of the sidewall and is covered by a lid member.

8 Claims, 5 Drawing Sheets

ROTATING ELECTRICAL MACHINE

CROSS-REFERENCE TO RELATED APPLICATION

This application is based upon and claims the benefit of priority of the prior Japanese Patent Application No. 2011-15338, filed on Jan. 27, 2011, the entire contents of which are incorporated herein by reference.

FIELD

The embodiment discussed herein is directed to a rotating electrical machine.

BACKGROUND

As a rotating electrical machine having a water-cooling structure, for example, a motor in which a refrigerant flow path is formed in a frame accommodating a rotor and a stator is known.

As a conventional technology of forming a refrigerant flow path in a frame, Japanese Patent Laid-open Publication No. H07-111758 discloses a technology of forming a frame by an inner cylindrical member and an outer cylindrical member and providing a partition between the inner cylindrical member and the outer cylindrical member.

However, in the above conventional technology, a refrigerant flowing in the refrigerant flow path may leak from the end portion of the inner cylindrical member and enter the inside of the frame.

SUMMARY

A rotating electrical machine according to an aspect of an embodiment includes a rotor rotatable around a rotation axis, a stator arranged to face the rotor, and a frame which accommodates the rotor and the stator and in which a refrigerant flow path is formed in a sidewall. The frame includes a through hole that penetrates from the refrigerant flow path to an outer periphery of the sidewall and is covered by a lid member.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Hereinafter, an embodiment of a rotating electrical machine disclosed in the present application will be described in detail based on the drawings. The present invention is not limited to this embodiment.

Figure 1:
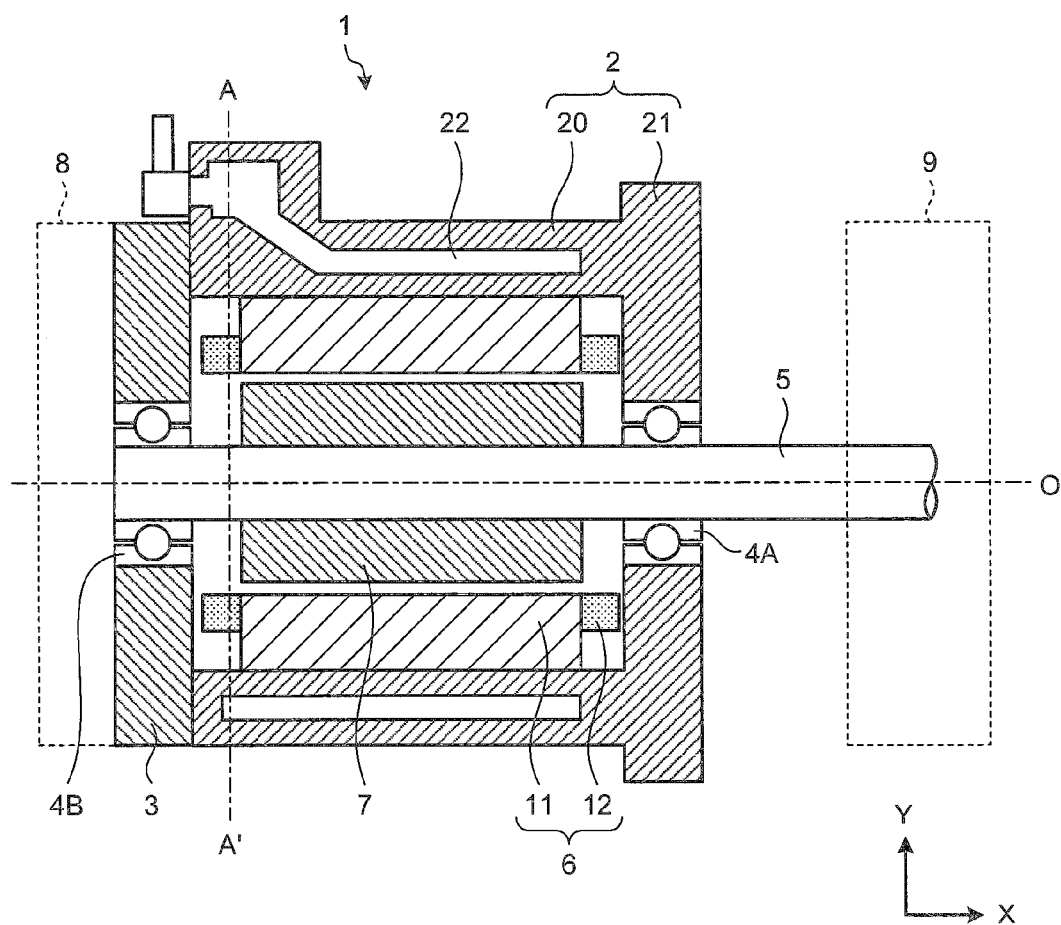
FIG. 1 is a schematic longitudinal cross-sectional view of a rotating electrical machine according to an embodiment.

First, the configuration of the rotating electrical machine according to the embodiment is explained with reference to FIG. 1. FIG. 1 is a schematic longitudinal cross-sectional view of the rotating electrical machine according to the embodiment.

As shown in FIG. 1, a rotating electrical machine 1 according to the present embodiment includes a frame 2, a bracket 3, bearings 4A and 4B, a shaft 5, a stator 6, and a rotor 7. In FIG. 1, each of an electric wiring unit 8 of the rotating electrical machine 1 and an external device 9 attached to the shaft 5 are illustrated mainly for indicating the arrangement relationship and a specific configuration thereof is omitted.

The frame 2 includes a sidewall 20 formed into a tubular shape and a flange 21 continuous with one end of the sidewall 20, and supports the bearing 4A at the inner peripheral portion of the flange 21. In this frame 2, a refrigerant flow path 22 is formed in the sidewall 20. The specific configuration of the frame 2 is described in detail later with reference to FIG. 2 to FIG. 6.

The bracket 3 is attached to the other end of the sidewall 20 at the outer peripheral portion and holds the bearing 4B at the inner peripheral portion. When attaching the bracket 3 to the frame 2, a seal member is attached for sealing a gap between the bracket 3 and the frame 2.

The shaft 5 is held by the bearings 4A and 4B to be rotatable around a rotation axis O. The shaft 5 is fixed to the rotor 7. The stator 6 includes a stator core 11 and a stator winding 12 and is fixed to the inner periphery of the frame 2. On the inner peripheral side of the stator 6, the rotor 7 is arranged to face the stator 6 via space.

A plurality of teeth is formed on the inner peripheral side of the stator core 11 of the stator 6 and the stator winding 12, which is wound by a distributed winding method using an insulation coated wire, is stored in slots between the teeth. Although not shown, the end portion of the insulation coated wire forming the stator winding 12 is drawn out from the inside of the frame 2 to the electric wiring unit 8 and is connected to the connection terminal of the electric wiring unit 8.

In the rotor 7, a plurality of permanent magnets is arranged on a cylindrical rotor core and the rotor 7 rotates around the center of the shaft 5 as the rotation axis O. The rotor core is, for example, formed by stacking a plurality of sheets of material, such as magnetic steel sheets, for reducing eddy current and has a function of channeling the magnetic flux of the permanent magnets.

When the rotating electrical machine 1 is a motor, the rotating magnetic field is generated inside the stator 6 by causing current to flow in the stator winding 12 of the stator 6. The rotor 7 rotates by interaction of this rotating magnetic field and the magnetic field generated by the permanent magnets of the rotor 7 and the shaft 5 rotates with the rotation of the rotor 7. On the other hand, when the rotating electrical machine 1 is a generator, the rotating electrical machine 1 performs an operation reverse to the motor. Specifically, the rotor 7 rotates with the rotation of the shaft 5 and current flows in the stator winding 12 of the stator 6.

Figure 2:
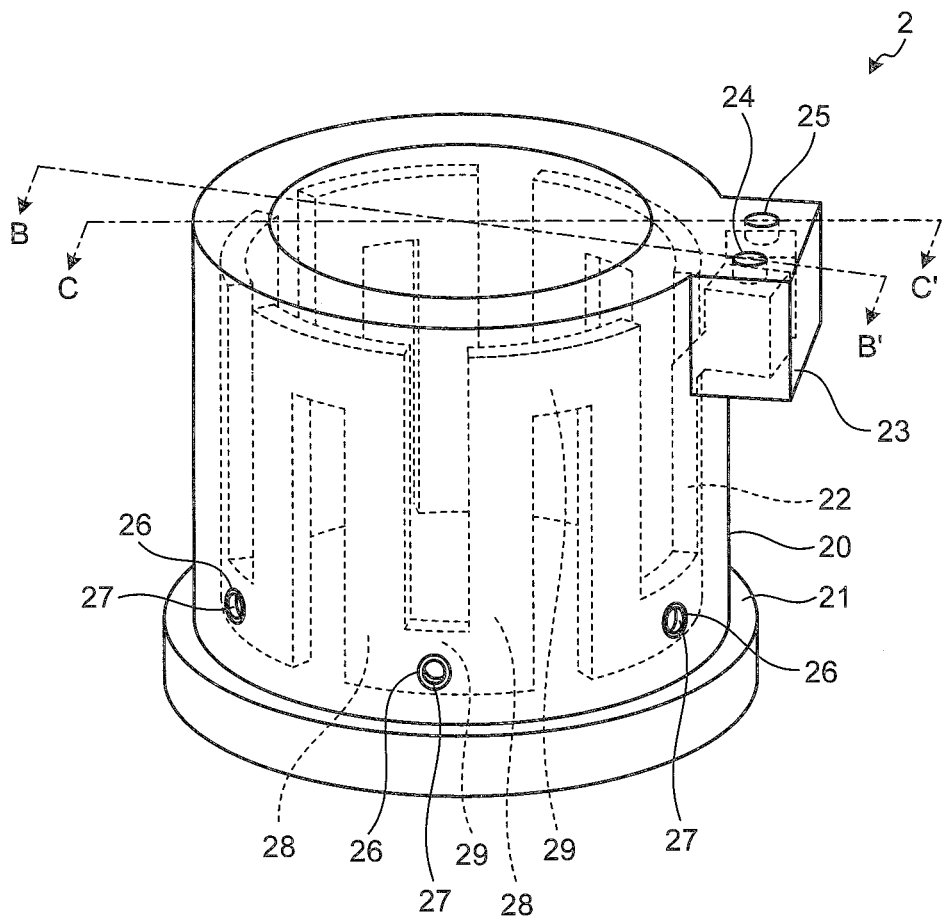
FIG. 2 is a schematic perspective view of a frame according to the embodiment.
Figure 3:
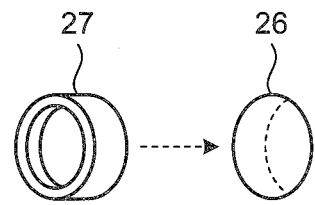
FIG. 3 is a schematic perspective view of a lid member according to the embodiment.

Next, the configuration of the above-described frame 2 is specifically explained with reference to FIG. 2 to FIG. 6. FIG. 2 is a schematic perspective view of the frame 2 and FIG. 3 is a schematic perspective view of a lid member to be described later.

As shown in FIG. 2, the refrigerant flow path 22, in which a refrigerant flows, is formed in the sidewall 20 of the frame 2. Moreover, an inlet 24, through which a refrigerant flows in, and an outlet 25, through which a refrigerant flows out, are formed in a projecting portion 23 projecting from the sidewall 20. A refrigerant that flows in through the inlet 24 flows out of the outlet 25 through the refrigerant flow path 22, so that the sidewall 20 of the frame 2 is cooled.

A plurality of though holes 26 covered by lid members 27 is formed in the sidewall 20 of the frame 2. The through holes 26 are holes that are formed on the flange 21 side of the sidewall 20 and penetrate from the refrigerant flow path 22 to the outer periphery of the sidewall 20. As shown in FIG. 3, the lid member 27 is a disk-shaped lid member and covers the through hole 26 by fitting into the formed portion of the through hole 26 in the sidewall 20.

In this manner, because the through holes 26 are formed in the sidewall 20 of the frame 2, even if the lid member 27 is removed from the through hole 26, a refrigerant leaked from the refrigerant flow path 22 through the through hole 26 flows outside the frame 2. Therefore, a refrigerant can be prevented from entering the inside of the frame 2 that accommodates the stator 6 and the rotor 7.

Moreover, because the through holes 26 are formed in the outer periphery of the sidewall 20, even a slight leakage of a refrigerant can be easily detected by a visual inspection. Furthermore, the through holes 26 are formed in the outer periphery of the sidewall 20, so that even if the lid member 27 needs to be replaced, a repair work and the like can be easily performed without disassembling the rotating electrical machine 1.

Furthermore, each through hole 26 is formed on the flange 21 side of the sidewall 20. That is, each through hole 26 is formed on the external device 9 (see FIG. 1) side attached to the shaft 5. On the other hand, the electric wiring unit 8 (see FIG. 1) is arranged on the bracket 3 side opposite to the external device 9 side.

Therefore, the through holes 26 are located distant from the electric wiring unit 8, so that even if a refrigerant leaks from the through hole 26, the refrigerant can be prevented from entering the electric wiring unit 8. When the rotating electrical machine 1 is a motor, the external device 9 is a device to be a load on the rotating electrical machine 1.

Moreover, as shown in FIG. 2, the outer peripheral diameter of the flange 21 is larger than the outer peripheral diameter of the sidewall 20. Therefore, for example, the flange 21 becomes an obstacle in the flow path of a refrigerant leaked from the through hole 26 by arranging the rotating electrical machine 1 in a state where the Y direction shown in FIG. 1 is a vertical direction, so that a refrigerant can be directed downward along the sidewall 20. A projection portion projecting continuously along a circumferential direction may be formed on the outer periphery of the sidewall 20 and a recess groove may be formed on the outer periphery of the sidewall 20 by the flange 21 and the projection portion. With such a configuration, a refrigerant leaked from the through hole 26 can be directed downward along the recess groove.

Moreover, the inlet 24 and the outlet 25 for a refrigerant are formed in the projecting portion 23 projecting from the sidewall 20. Therefore, the operability and the degree of freedom in piping can be improved. Specially, the operability and the degree of freedom in piping can be further improved by arranging the rotating electrical machine 1 in a state where the Y direction shown in FIG. 1 is a vertical direction and arranging the projecting portion 23 in the upper portion of the rotating electrical machine 1.

In the example shown in FIG. 1, the configuration in which the inlet 24 and the outlet 25 are open to the electric wiring unit 8 side is shown, however, the inlet 24 and the outlet 25 may be open to the external device 9 side opposite to the electric wiring unit 8 side or may be open toward the same direction (Y direction shown in FIG. 1) as the through hole 26.

For example, the frame 2 can be molded by injecting molten metal into a casting mold after arranging a core for forming the refrigerant flow path in the casting mold. In this case, core supporting portions for supporting the core in the casting mold are formed to project in a radial direction of the frame 2.

Consequently, the refrigerant flow path is formed in the sidewall of the frame by the core and the through holes are formed by the core supporting portions. Specifically, the frame 2 including the refrigerant flow path 22 is integrally formed and moreover, the through holes formed by the core supporting portions are formed as the through holes 26 in the sidewall 20 of the frame 2. Therefore, the through holes formed by the core supporting portions can be avoided from being formed in the end surface or the inner periphery of the frame 2.

Figure 4:
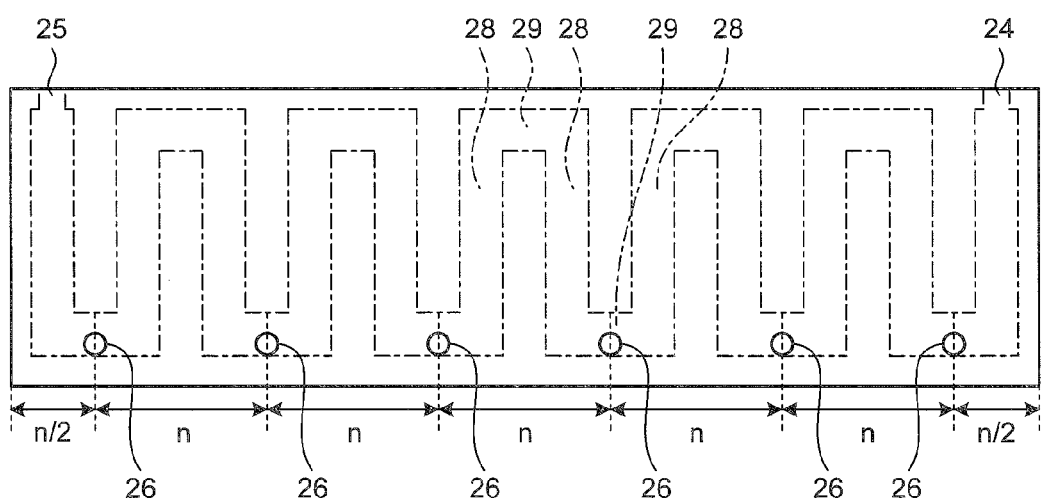
FIG. 4 is a schematic sidewall developed view of the frame according to the embodiment.

FIG. 4 is a schematic sidewall developed view of the frame 2. As shown in FIG. 4, the through holes 26 are formed to align at predetermined pitches n in the circumferential direction of the sidewall 20. Therefore, when molding the frame 2 using a core, core supporting portions can be arranged at the predetermined pitches in the circumferential direction of the core. Thus, the core can be arranged stably in a casting mold and therefore molding of the frame 2 can be performed accurately.

Moreover, as shown in FIG. 2 and FIG. 4, the refrigerant flow path 22 includes a serpentine flow path formed of a plurality of first flow paths 28 extending in the axis direction of the shaft 5 and second flow paths 29 each connecting one ends of adjacent first flow paths 28 in the circumferential direction of the sidewall 20. Each through hole 26 is formed to penetrate from the second flow path 29, which connects one ends of the first flow paths 28, to the outer periphery of the sidewall 20.

Therefore, when molding the frame 2 using a core, the load on core supporting portions by the core can be suppressed from varying largely between the core supporting portions, so that the core can be arranged more stably in a casting mold. Moreover, because each through hole 26 is formed at a position penetrating to the outer periphery of the sidewall 20 from the area close to the flange 21 in the second flow path 29, the core after finishing molding of the frame 2 can be easily scraped out from the through holes 26. The through holes 26 may be formed into an elliptical shape having a long side in the circumferential direction of the sidewall 20 to further facilitate scraping of the core.

Moreover, the projecting portion 23 is formed on the end portion side of the frame 2 opposite to the through holes 26. Specifically, as shown in FIG. 1 and FIG. 2, the through holes 26 are formed on one end portion side of the sidewall 20 and the projecting portion 23 is formed on the other end portion side of the sidewall 20. Therefore, when molding the frame 2 using a core, the core can be arranged more stably in a casting mold. For example, when core supporting portions that form the through holes 26 are supported by the upper portion of the casting mold, the core can be arranged more stably in the casting mold by supporting the opening forming portions, in which the inlet 24 and the outlet 25 are formed, by the lower portion of the casting mold.

Figure 5A:
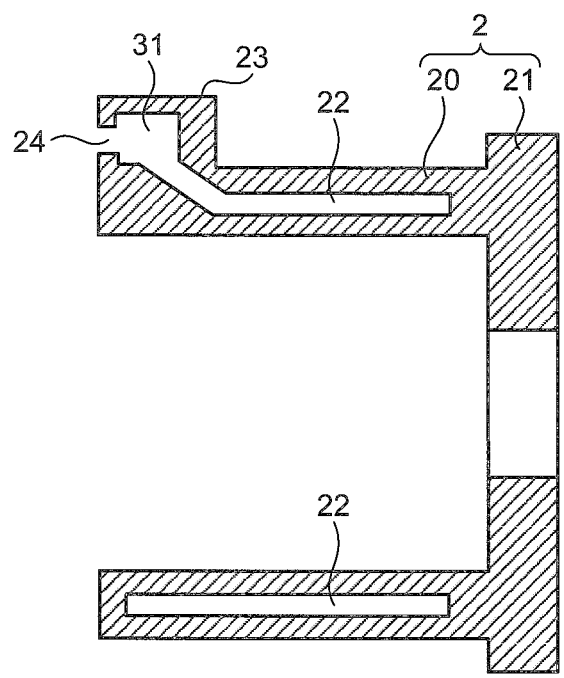
FIG. 5A and FIG. 5B are schematic longitudinal cross-sectional views of the frame according to the embodiment.
Figure 5B:
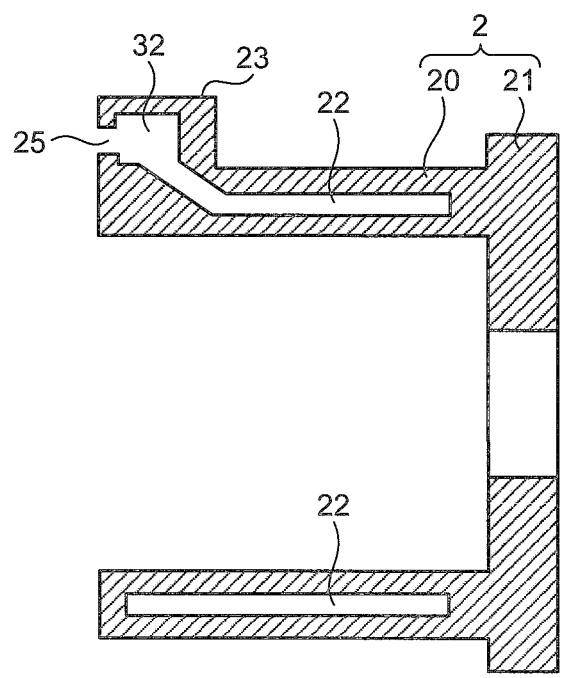
Figure 6:
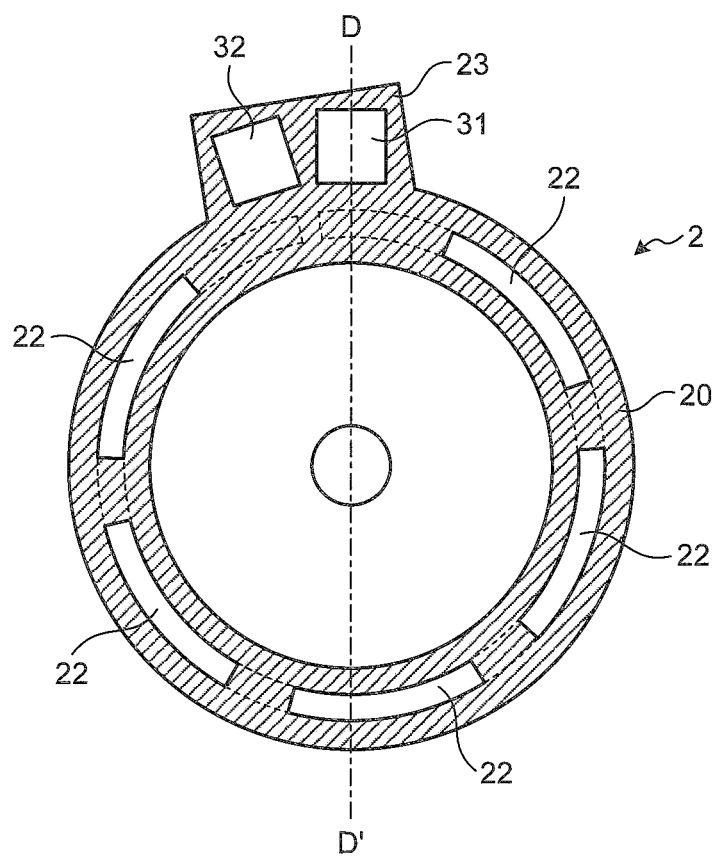
FIG. 6 is a schematic transverse cross-sectional view of the frame according to the embodiment.

Next, flow paths connecting the inlet 24 and the outlet 25 and the refrigerant flow path 22 are explained with reference to FIG. 5A, FIG. 5B, and FIG. 6. FIG. 5A is a schematic longitudinal cross-sectional view taken along line B-B' in FIG. 2, FIG. 5B is a schematic longitudinal cross-sectional view taken along line C-C' in FIG. 2, and FIG. 6 is a transverse cross-sectional view of the frame 2 taken along line A-A' in FIG. 1. The portion along line D-D' in FIG. 6 corresponds to the cross-sectional position in FIG. 1.

As shown in FIG. 5A, FIG. 5B, and FIG. 6, a first intermediate flow path 31 and a second intermediate flow path 32 are formed in the projecting portion 23. The first intermediate flow path 31 is a flow path that is provided between the inlet 24 and the refrigerant flow path 22 and has a larger flow path diameter than the inlet 24 and the refrigerant flow path 22. The second intermediate flow path 32 is a flow path that is provided between the outlet 25 and the refrigerant flow path 22 and has a larger flow path diameter than the outlet 25 and the refrigerant flow path 22.

The projecting portion 23 including the first intermediate flow path 31 and the second intermediate flow path 32 and the through holes 26 are formed to be end portions opposed to each other. Therefore, when molding the frame 2 using a core, the core can be arranged more stably in the casting mold. In other words, when core supporting portions are supported by the upper portion of the casting mold, the core portion for forming the first intermediate flow path 31 and the second intermediate flow path 32 is located on the lower portion side of the casting mold to serve as a weight. Therefore, the core can be arranged more stably in the casting mold and molding of the frame 2 can be performed more accurately.

As above, according to the rotating electrical machine 1 in the present embodiment, in the frame 2, in which the refrigerant flow path 22 is formed in the sidewall 20, the through holes 26, which penetrate from the refrigerant flow path 22 to the outer periphery of the sidewall 20 and are covered by the lid members 27, are included, so that even if the lid member 27 is removed from the through hole 26, a refrigerant can be prevented from entering the inside of the frame 2 that accommodates the stator 6 and the rotor 7.

In the above embodiment, the through hole 26 is a circular hole, however, it is not limited thereto and the through hole 26 may be a polygonal hole or the like. Moreover, explanation is given for the frame 2 in which the flange 21 is integrated with the sidewall 20, however, the flange 21 and the sidewall 20 may be configured separately.

Moreover, in the above embodiment, although the first flow paths 28 and the second flow paths 29 are connected to be orthogonal to each other, however, the first flow paths 28 may be curved to be connected to the second flow paths 29. Consequently, the flow path resistance between the first flow paths 28 and the second flow paths 29 can be reduced. The flow path resistance can be suppressed from increasing by setting the thickness in the radial direction of the sidewall 20 and the flow path diameter of the first flow paths 28 and the second flow paths 29 to be approximately the same, however, the thickness in the radial direction and the flow path diameter can be variously changed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rotating electrical machine comprising:
a rotor rotatable around a rotation axis;
a stator arranged to face the rotor; and
a frame which accommodates the rotor and the stator, the frame comprising:
a sidewall that surrounds an outer circumference of the rotor and the stator;
a projecting portion in which an inlet and an outlet for a refrigerant are formed and which is provided on one end portion of the side wall in a rotation axis direction to project from the sidewall;
a refrigerant flow path that is formed in the sidewall, the refrigerant flow path comprising:
first flow paths that extend in directions parallel to the rotation axis of the rotor; and
second flow paths that connect one ends of the adjacent first flow paths, the second flow paths extending in a circumferential direction about the rotation axis; and
through holes that are formed on one other end portion of the sidewall in the rotation axis direction to align at a predetermined pitch over a whole circumference of the sidewall to penetrate from the respective second flow paths to an outer periphery of the sidewall and that are covered by respective lid members,
wherein the refrigerant flow path has a serpentine flow path that is formed by the first and second flow paths,
wherein the one end portion of the sidewalls is opposite to the one other end portion of the sidewall in the rotation axis direction, and
wherein the inlet and outlet of the projecting portion are arranged in the circumferential direction.

2. The rotating electrical machine according to claim 1, wherein each of the through holes is formed on a side of an external device attached to a shaft fixed to the rotor.

3. The rotating electrical machine according to claim 1, wherein the through holes is arranged opposite to and distant from an electric wiring unit.

4. The rotating electrical machine according to claim 1, wherein each of the through holes is provided at a location halfway along a length of the second flow path in the circumferential direction.

5. The rotating electrical machine according to claim 1, wherein the frame further comprises a flange that is continuous with one end of the sidewall having a cylindrical shape and projects from the sidewall in a radial direction.

6. A rotating electrical machine comprising:
a rotor rotatable around a rotation axis;
a stator arranged to face the rotor;
accommodation means for accommodating the rotor and the stator, the accommodation means comprising:
a sidewall that surrounds an outer circumference of the rotor and the stator;
a projecting portion in which an inlet and an outlet for a refrigerant are formed and which is provided on one end portion of the side wall in a rotation axis direction to project from the sidewall;
refrigerant means for cooling the stator in the sidewall, the refrigerant flow path means comprising:
first flow paths that extend in directions parallel to the rotation axis of the rotor; and
second flow paths that connect one ends of the adjacent first flow paths, the second flow paths extending in a circumferential direction about the rotation axis; and
through holes that are formed on one other end portion of the sidewall in the rotation axis direction to align at a predetermined pitch over a whole circumference of the sidewall to penetrate from the respective second flow paths to an outer periphery of the sidewall and that are covered by respective lid members, wherein the refrigerant means has a serpentine flow path that is formed by the first and second flow paths, wherein the one end portion of the sidewalls is opposite to the one other end portion of the sidewall in the rotation axis direction, and wherein the inlet and outlet of the projection portion are arranged in the circumferential direction.

7. The rotating electrical machine according to claim 6, wherein the through holes are arranged opposite to and distant from an electric wiring unit.

8. The rotating electrical machine according to claim 6, wherein each of the through holes is provided at a location halfway along a length of the second flow path in the circumferential direction.

* * * * *